US006220223B1

(12) United States Patent
Weisman, II et al.

(10) Patent No.: US 6,220,223 B1
(45) Date of Patent: *Apr. 24, 2001

(54) SYSTEM AND METHOD FOR SELECTIVELY LIMITING ENGINE OUTPUT

(75) Inventors: S. Miller Weisman, II, Farmington Hills; Dennis M. LeTang, Canton, both of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/420,496

(22) Filed: Oct. 19, 1999

Related U.S. Application Data

(63) Continuation of application No. 09/050,685, filed on Mar. 30, 1998, now Pat. No. 6,026,784, which is a continuation of application No. 08/737,486, filed on Mar. 12, 1997, now Pat. No. 5,732,676, which is a continuation-in-part of application No. PCT/US95/06052, filed on Mar. 15, 1995, which is a continuation-in-part of application No. 08/243,103, filed on May 16, 1994, now Pat. No. 5,477,827, and a continuation-in-part of application No. 09/000,502, filed on Dec. 30, 1997, which is a continuation of application No. 08/869,036, filed on Jun. 5, 1997, now Pat. No. 5,847,644, which is a division of application No. 08/673,199, filed on Jun. 27, 1996, now Pat. No. 5,647,317, which is a division of application No. 08/535,617, filed on Sep. 28, 1995, now Pat. No. 5,615,654, which is a division of application No. 08/406,114, filed on Mar. 17, 1995, now Pat. No. 5,483,927, which is a division of application No. 08/113,424, filed on Aug. 27, 1993, now Pat. No. 5,445,128.

(51) Int. Cl.$^7$ .................................................. F02D 41/00

(52) U.S. Cl. .......................... 123/436; 123/352; 180/197

(58) Field of Search .................................... 123/436, 350, 123/352, 480; 180/197, 248, 249

(56) References Cited

U.S. PATENT DOCUMENTS

| 1,239,523 | 9/1917 | Rogers . |
| 2,627,254 | 2/1953 | DeJuhasz . |
| 3,439,655 | 4/1969 | Eyzat . |
| 3,569,724 | 3/1971 | Kuehn, III . |
| 3,827,419 | 8/1974 | Isomura . |
| 3,878,915 | 4/1975 | Purland et al. . |
| 3,891,046 | 6/1975 | Oicles . |
| 3,913,419 | 10/1975 | Sale et al. ............................. 477/54 |
| 4,006,723 | 2/1977 | Schmidli . |
| 4,022,165 | 5/1977 | Eckert . |

(List continued on next page.)

OTHER PUBLICATIONS

Bryden et al., PT Pacer: An Integrated Road Speed Governor, 1990, pp. 83–91.

Bara et al., Field Experience with the DDC Electronic Control System, SAE Technical Paper Series, 1990, pp. 363–373.

(List continued on next page.)

*Primary Examiner*—Henry C. Yuen
*Assistant Examiner*—Hieu T. Vo
(74) *Attorney, Agent, or Firm*—Brooks & Kushman P.C.

(57) ABSTRACT

A system and method for controlling an engine to limit engine output include determining engine speed, determining vehicle speed, determining a ratio based on the engine speed and the vehicle speed, comparing the ratio to a threshold, and controlling the engine to limit engine output based on the comparison. The ratio used for comparison may be selected from a plurality of ratios based on a current gear ratio which may be an actual or virtual (computed) gear ratio. The threshold may represent a low gear torque limit threshold in one embodiment. A vehicle speed sensor fault may also be considered to determine whether to limit the engine output. In one embodiment, engine output is limited by limiting engine torque.

29 Claims, 8 Drawing Sheets

U.S. PATENT DOCUMENTS

| | | |
|---|---|---|
| 4,181,103 | 1/1980 | Sturdy . |
| 4,186,693 | 2/1980 | Thien et al. . |
| 4,286,683 | 9/1981 | Zlingner et al. . |
| 4,354,467 | 10/1982 | Noddings et al. . |
| 4,367,706 | 1/1983 | Scheying . |
| 4,385,604 | 5/1983 | Piala . |
| 4,393,732 | 7/1983 | Suzuki et al. . |
| 4,419,866 | 12/1983 | Howland . |
| 4,421,075 | 12/1983 | Mandel . |
| 4,425,766 | 1/1984 | Claypole . |
| 4,439,833 | 3/1984 | Yamaguchi et al. . |
| 4,482,812 | 11/1984 | Hori et al. . |
| 4,493,303 | 1/1985 | Thompson et al. . |
| 4,499,542 | 2/1985 | Hamajima et al. . |
| 4,520,778 | 6/1985 | Nanjo et al. . |
| 4,534,326 | 8/1985 | Bowcatt . |
| 4,642,771 | 2/1987 | Asagi et al. . |
| 4,671,232 | 6/1987 | Stumpp et al. . |
| 4,697,561 | 10/1987 | Citron . |
| 4,711,209 | 12/1987 | Henkel . |
| 4,718,016 | 1/1988 | Sudo . |
| 4,737,913 | 4/1988 | Blee et al. . |
| 4,745,898 | 5/1988 | Egler et al. . |
| 4,747,056 | 5/1988 | Yamamoto et al. . |
| 4,750,460 | 6/1988 | Peter . |
| 4,766,863 | 8/1988 | Fujimori . |
| 4,779,490 | 10/1988 | Milunas et al. . |
| 4,782,803 | 11/1988 | Kikuchi . |
| 4,833,612 | 5/1989 | Okuno et al. . |
| 4,835,694 | 5/1989 | Yamamoto et al. . |
| 4,838,232 | 6/1989 | Wich . |
| 4,843,578 | 6/1989 | Wade . |
| 4,843,915 | 7/1989 | Sugimura et al. . |
| 4,849,899 | 7/1989 | Cote et al. . |
| 4,853,858 | 8/1989 | Kumura . |
| 4,860,200 | 8/1989 | Holmbo . |
| 4,862,367 | 8/1989 | Tada et al. . |
| 4,878,465 | 11/1989 | Hanson et al. . |
| 4,896,267 | 1/1990 | Frantz et al. . |
| 4,896,569 | 1/1990 | Ito et al. . |
| 4,918,606 | 4/1990 | Ito et al. . |
| 4,922,769 | 5/1990 | Tury . |
| 4,928,242 | 5/1990 | Suzuki . |
| 4,936,277 | 6/1990 | Deutsch et al. . |
| 4,943,923 | 7/1990 | Naito . |
| 4,965,730 | 10/1990 | Kurihara et al. . |
| 4,969,099 | 11/1990 | Iwatsuki et al. . |
| 5,003,483 | 3/1991 | Hedstrom . |
| 5,019,986 | 5/1991 | Londt et al. . |
| 5,046,007 | 9/1991 | McCrery et al. . |
| 5,054,445 | 10/1991 | Henkel et al. . |
| 5,060,540 | 10/1991 | Yamaguchi . |
| 5,072,703 | 12/1991 | Sutton . |
| 5,103,785 | 4/1992 | Henkel . |
| 5,117,793 | 6/1992 | Taue et al. . |
| 5,121,324 | 6/1992 | Rini et al. . |
| 5,138,996 | 8/1992 | Fiorenza, II . |
| 5,140,826 | 8/1992 | Hanson et al. . |
| 5,156,128 | 10/1992 | Nakagawa . |
| 5,165,373 | 11/1992 | Cheng . |
| 5,186,015 | 2/1993 | Raehrich et al. . |
| 5,203,423 | 4/1993 | Fujiwara et al. . |
| 5,212,640 | 5/1993 | Matsuda ................................ 701/34 |
| 5,216,938 | 6/1993 | Yamaguchi . |
| 5,218,945 | 6/1993 | Kapellen et al. . |
| 5,222,469 | 6/1993 | Sutton . |
| 5,235,512 | 8/1993 | Winkelman et al. . |
| 5,243,523 | 9/1993 | Stepper et al. . |
| 5,257,672 | 11/1993 | Ohtagaki et al. . |
| 5,260,876 | 11/1993 | Oo et al. . |
| 5,261,374 | 11/1993 | Gronenberg et al. . |
| 5,263,453 | 11/1993 | Wakahara et al. . |
| 5,265,575 | 11/1993 | Norota . |
| 5,275,011 | 1/1994 | Hanson . |
| 5,278,760 | 1/1994 | Ribbens et al. . |
| 5,287,282 | 2/1994 | Imai . |
| 5,305,216 | 4/1994 | Okura et al. . |
| 5,307,644 | 5/1994 | Cummins et al. . |
| 5,315,972 | 5/1994 | Judy et al. . |
| 5,317,998 | 6/1994 | Hanson et al. . |
| 5,329,455 | 7/1994 | Oo et al. . |
| 5,331,923 | 7/1994 | Matsushita . |
| 5,333,109 | 7/1994 | Oo et al. . |
| 5,343,780 | 9/1994 | McDaniel et al. . |
| 5,385,129 | 1/1995 | Eyberg . |
| 5,386,810 | 2/1995 | Gronenberg et al. . |
| 5,445,128 | 8/1995 | Letang et al. . |
| 5,460,581 | 10/1995 | Ueda . |
| 5,469,826 | 11/1995 | Thomas et al. . |
| 5,477,827 | 12/1995 | Weisman, II et al. . |
| 5,481,909 | 1/1996 | Deutsch et al. . |
| 5,573,475 | 11/1996 | Sakakiyama et al. . |
| 5,601,510 | 2/1997 | Sakakiyama et al. . |
| 5,609,067 | 3/1997 | Mitchell et al. . |
| 5,609,550 | 3/1997 | Saxena et al. . |
| 5,613,921 | 3/1997 | Sugiyama et al. . |
| 5,645,508 | 7/1997 | Kim . |
| 5,649,880 | 7/1997 | Tsutsui et al. . |
| 5,655,408 | 8/1997 | Sakakiyama et al. . |
| 5,676,620 | 10/1997 | Ulm et al. . |
| 5,680,307 | 10/1997 | Issa et al. . |
| 6,026,784 | 2/2000 | Weisman et al. ..................... 123/436 |

OTHER PUBLICATIONS

Jaliwala, The Electronics Jigsaw Puzzle In The Trucking Industry, SAE Technical Paper Series, 1991, pp. 1–15.

Jaliwala, Onboard Computers Are a Safe Bet, SAE Technical Paper Series, 1990, pp. 121–126.

Austin et al., Service and Support of Electronic Products In the Trucking Industry, SAE Technical Paper Series, 1987, pp. 1–9.

Austin et al., Sensor and Actuator Requirements for Heavy Duty Diesels, SAE Technical Paper Series, 1983, pp. 11–23.

Wolber et al., Automotive Engine Control Sensors '85, SAE Technical Paper Series, 1985, pp. 101–112.

Hames et al., Advanced Electronic Diesel Control, pp. 151–160.

Wolber, Sensors for Heavy Duty Engines and Vehicles, SAE Technical Paper Series, 1987, pp. 1–6.

SYSTEM AND METHOD FOR SELECTIVELY LIMITING ENGINE OUTPUT

CROSS REFERENCE TO RELATED APPLICATIONS

This application is a continuation of commonly owned and U.S. Pat. application No. 09/050,685 filed Mar. 30, 1998, now U.S. Pat. No. 6,026,784 which is a continuation of U.S. Pat. application No. 08/737,486 filed Mar. 12, 1997, now U.S. Pat. No. 5,732,676, which is a continuation-in-part under §371 of PCT/US95/06052 filed Mar. 15, 1995 which is a continuation-in-part of U.S. application No. 08/243,103 filed May 16, 1994, now U.S. Pat. No 5,477,827 and a continuation-in-part of U.S. Pat. application No. 09/000,502 filed Dec. 30, 1997, which is a continuation of U.S. Pat. application No. 08/869,036 filed Jun. 5, 1997, now U.S. Pat. No. 5,847,644 which is a division of U.S. Pat. application. No. 08/673,199 filed Jun. 27,1996, now U.S. Pat. No. 5,647,317 which is a division of U.S. Pat. application No. 08/535,617 filed Sep. 28, 1995, now U.S. Pat. No. 5,615,654 which is a division of U.S. Pat. application No. 08/406,114 filed Mar. 17, 1995, now U.S. Pat. No. 5,483,927 which is a is a division of U.S. Pat. application No. 08/113,424 filed Aug. 27, 1993, now U.S. Pat. No. 5,445,128.

TECHNICAL FIELD

The present invention relates to a method and system for controlling an internal combustion engine.

BACKGROUND ART

In the control of engines, the conventional practice utilizes electronic control units having volatile and nonvolatile memory, input and output driver circuitry, and a processor capable of executing a stored instruction set, to control the various functions of the engine and its associated systems. A particular electronic control unit communicates with numerous sensors, actuators, and other electronic control units necessary to control various functions, which may include various aspects of fuel delivery, transmission control, or myriad others.

Early complex systems and subsystems which performed critical functions required separate control units which could promptly respond to dynamic vehicle situations and initiate appropriate actions. For example, a vehicle may have employed a brake controller, a cruise control module, a cooling fan controller, an engine controller, and a transmission controller, such that each vehicle system or subsystem had its own stand-alone controller. These controllers were either electronic control units or electronic circuits which may have had little or no communication among themselves or with a master controller. Thus, the vehicle was operated as a distributed control system, which often made it difficult to optimize overall vehicle performance by coordinating control of the various systems and subsystems.

As control systems became more sophisticated, the various distributed controllers were connected to communicate status information and coordinate actions. However, inter-controller communication delays were often unacceptable for critical control tasks, thus requiring independent processors or circuitry for those tasks. This expanded the overall capabilities of the control system and was often necessary to meet increasing consumer demands as well as more stringent emission control standards.

To meet these stricter standards, it has been necessary to expand the capabilities of the engine control system to more accurately control the engine operation. The complexity of the resulting control systems has often resulted in difficulty in the manufacturing, assembling, and servicing of vehicles. Manufacturers have attempted to decrease part proliferation, while increasing the accuracy of control, by combining increasingly more control functions into a single controller.

Advancements in microprocessor technology have facilitated the evolution of engine control systems. These systems began by implementing relatively simple control functions with mechanical apparatus, and progressed to more involved control schemes with dedicated controllers, before having matured as complex control strategies realized by a comprehensive engine controller. Many engine control systems found in the prior art address only a single subsystem control strategy and fail to capitalize on the advantages afforded by these microprocessor advancements. Another difficulty encountered by traditional, distributed engine control systems is the inability to protect the engine or engine components from system failures. Certain engine components, operated under extreme operating conditions, may fail.

The desire to provide application specific vehicles at a competitive price has led to the availability of a number of customer options which may include some of the systems already noted, such as vehicle speed control, engine speed control, or engine torque control. This in turn has led to a large number of possible subsystem combinations, thus increasing the costs associated with manufacturing and assembly as well as the cost of field service due to the large number of spare components which must be manufactured and stored.

It is desirable to have an electronic control unit capable of integrating the control of various engine functions and associated vehicle systems, thus eliminating inter-controller communication delays and harmonizing engine control with other vehicle subsystems. An additional benefit accrues from replacing independent stand-alone controllers with a comprehensive controller, to reduce part proliferation in the vehicle manufacturing, assembly, and service environments, leading to an associated reduction in the cost of these functions.

It is also desirable in optimizing overall vehicle performance, to have an electronic control unit which coordinates control of the engine with control of the transmission for smoother, more efficient shifting of the transmission. It is desirable to provide for throttle logic, and to provide for cylinder balancing to determine relative power contribution from each cylinder.

Due to increasing cost of fuel, it is further desirable to provide a controller which encourages certain driving techniques which enhance fuel economy. For example, it is desirable to provide an incentive to limit engine idling while the vehicle is stationary so as to reduce average noise levels and to reduce fuel consumption. It is further desirable to encourage the use of cruise control to minimize transmission shifting and increase overall fuel economy whenever possible.

It is also desirable to provide a controller which can control the engine in a manner which protects engine components during extreme operating conditions. For example, if a turbocharged vehicle is operated at high altitudes, the turbocharger will spin faster than a similar turbocharger operated at lower altitudes, and can be damaged.

SUMMARY OF THE INVENTION

It is therefore an object of the present invention to provide an integrated engine controller capable of performing a balance test for determining cylinder contributions.

It is a further object of the present invention to provide an integrated engine controller capable of controlling fuel delivery to maximize fuel economy via driver incentives, and capable of protecting engine components in the presence of certain operating conditions.

It is an additional object of the present invention to provide an integrated engine controller capable of performing throttle logic, and capable of controlling the transmission in conjunction with the engine.

Another object of the present invention is to provide an engine controller which limits engine idling time while the vehicle is stationary to reduce unnecessary fuel consumption and noise.

Yet another object of the present invention is to provide a engine controller which limits engine idling based on ambient air temperature so as to permit engine idling under conditions justifying use of vehicle heating or cooling systems.

A further object of the present invention is to provide an engine controller which estimates ambient air temperature so that an additional temperature sensor is not required.

Still further, it is an object of the present invention to provide an integrated engine controller capable of determining service intervals and performing trend analyses.

In carrying out the above objects and other objects and features of the present invention, a system and method for controlling an engine include determining engine speed, determining vehicle speed, determining a ratio based on the engine speed and the vehicle speed, comparing the ratio to a threshold, and controlling the engine to limit engine output based on the comparison. In one embodiment, controlling the engine includes limiting engine output torque. The threshold may represent a low gear torque limit, for example. The method may also include the step of detecting or determining a vehicle speed sensor fault and controlling the engine to limit engine output based on the vehicle speed sensor fault.

A system is also provided for implementing an engine control method according to the present invention.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
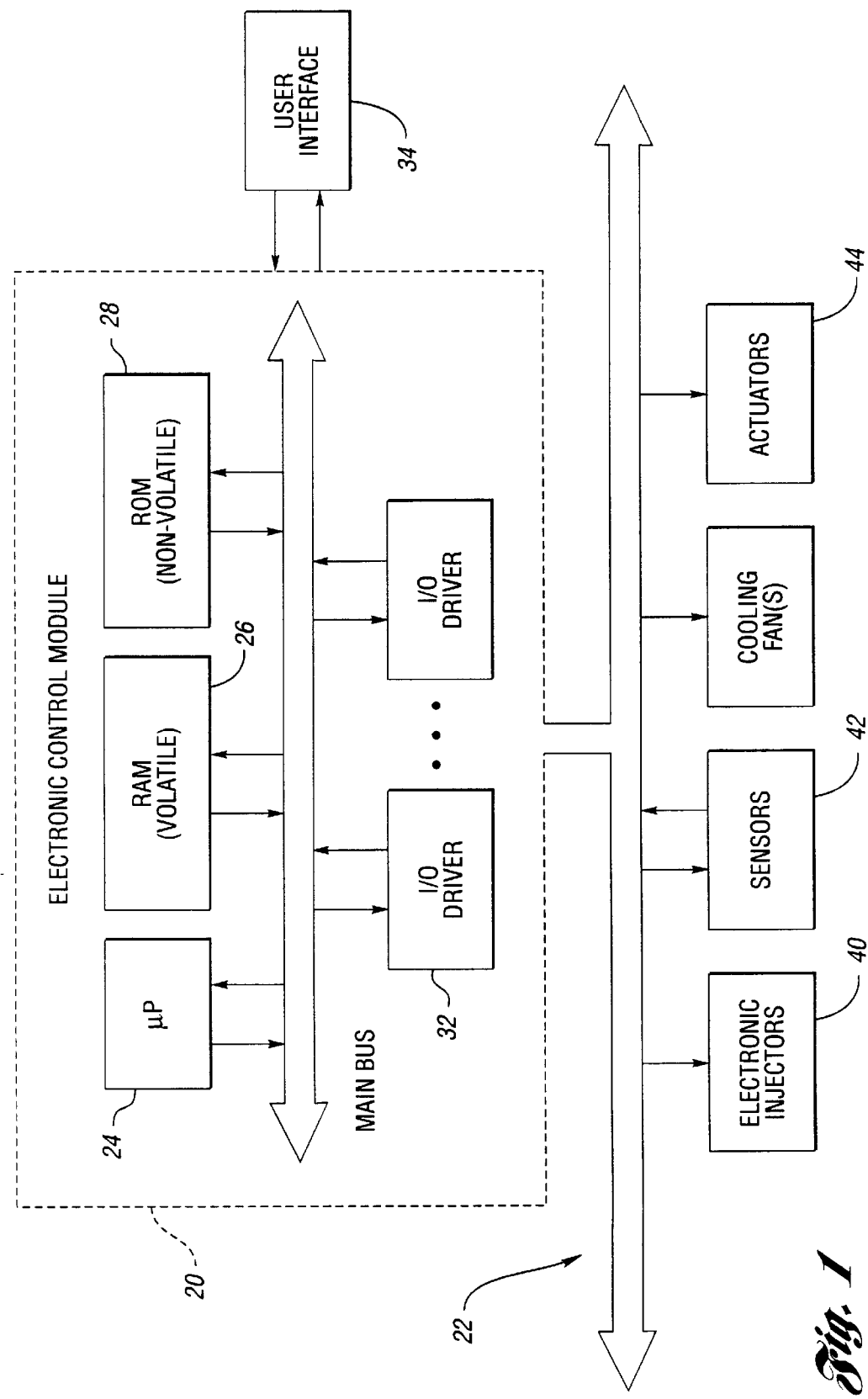
FIG. 1 is a block diagram of an integrated control system for an internal combustion engine in accordance with the present invention.

Referring now to FIG. 1, there is shown an electronic control module (ECM) 20 in communication with typical engine componentry, shown generally by reference numeral 22, and a user-interface 34. ECM 20 includes a microprocessor 24 having volatile random-access memory (RAM) 26, and nonvolatile read-only memory (ROM) 28. Of course, ECM 20 may contain other types of memory instead of, or in addition to, RAM 26 and ROM 28, such as flash EPROM or EEPROM memories, as is well known in the art.

The ROM 28, or other nonvolatile memory, may contain instructions, which are executed to perform various control and information functions, as well as data tables, which contain calibration values and parameters characterizing normal engine operation. Microprocessor 24 imparts control signals to, and receives signals from, input and output (I/O) drivers 32. The I/O drivers 32 are in communication with the engine componentry 22 and serve to protect the controller from hostile electrical impulses while providing the signals and power necessary for engine control according to the present invention. The ECM componentry detailed above is interconnected by data, address and control buses. It should be noted that there are a variety of other possible control schemes which include various combinations of microprocessors and electric or electronic circuits which could perform the same function.

With continuing reference to FIG. 1, engine componentry 22 includes a plurality of electronic unit injectors (EUI) 40, each associated with a particular engine cylinder; and a plurality of sensors 42 for indicating various engine operating conditions, such as coolant temperature, ambient air temperature, intake manifold air temperature, inlet air temperature, engine oil temperature, fuel temperature, innercooler temperature, throttle position, intake manifold pressure, fuel pressure, oil pressure, coolant pressure, cylinder position, and cylinder sequencing, to name a few. Engine componentry 22 also includes actuators 44 which may include solenoids, variable valves, indicator lights, motors, and/or generators. It should be appreciated that the ECM 20 may also be in communication with other vehicle componentry and microprocessors which control associated vehicle systems, such as the brakes, the transmission, a vehicle management system or a fleet management radio transponder.

The user-interface, or data-hub, 34 is used to store user-selected monitoring parameters and associated values for those parameters, and to determine service intervals and perform trend analyses. User selected parameters may include adjustable limits, such as desired engine oil life. Engine historical information may include diagnostic information which is used to assist personnel performing routine maintenance, or troubleshooting malfunctions, as well as engine and vehicle operation data, which may be analyzed to evaluate vehicle operator performance in addition to vehicle performance. The user-interface 34 also preferably performs component lifing and trend analyses, as described in greater detail below. It should be appreciated that although FIG. 1 illustrates the user-interface as being external to the ECM 20, certain operations performed by the user-interface could, of course, also be performed by the ECM 20.

The electronic control module 20 executes software to implement the various features of the present invention. In describing these features, equations will be provided and reference will be made to variables utilized by the ECM in executing the software. It should be noted that equation variables shown in lower-case italics are calibration variables, whereas equation variables shown in SMALL CAPS represent function variables, whose values vary and are based on, for example, operating conditions such as intake manifold pressure or engine speed.

Figure 2:
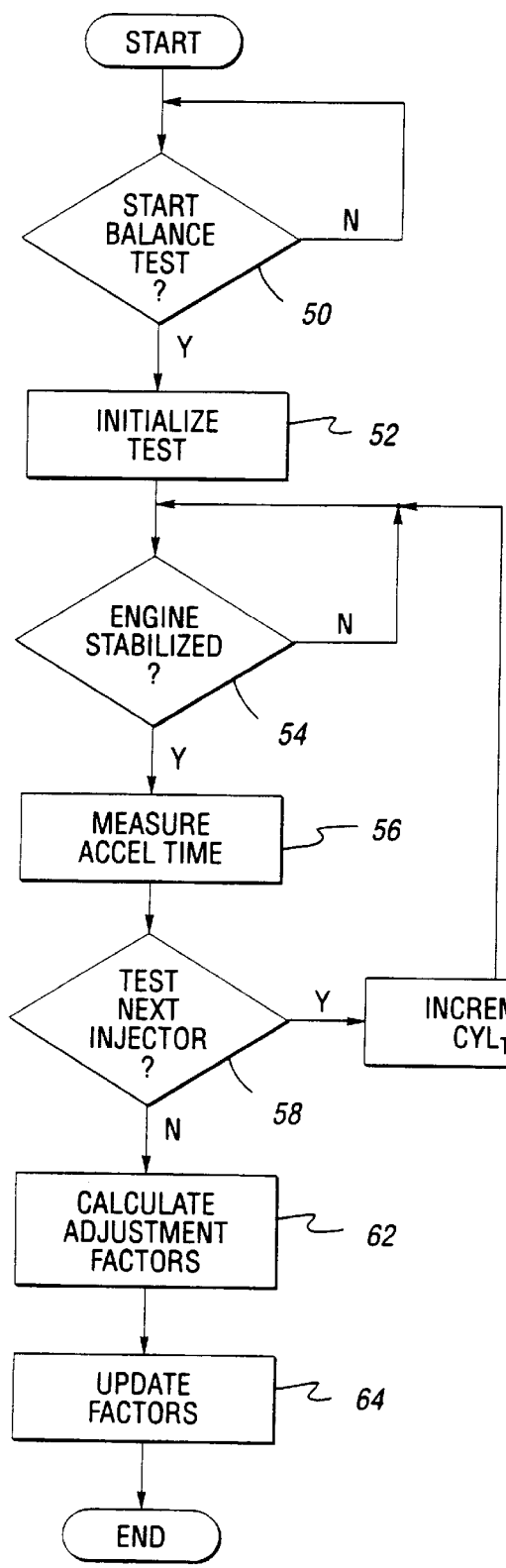
FIG. 2 is a flow chart detailing the steps for cylinder balance testing according to the present invention.

Referring now to FIG. 2, there is shown a flow chart detailing the steps for an injector balance test according to the present invention. In the preferred embodiment, the ECM 20 attempts to balance the injectors 40 so that power delivery is approximately equal, by performing an acceleration test to determine the relative power from each injector. At step 50, the ECM determines whether the acceleration balance test is to be started. In the preferred embodiment, the test is activated if an injector balance message is received by the ECM 20 from the user-interface 34 and either the vehicle speed is zero or the vehicle speed sensor (VSS) is not configured and the balance flag (BALENB) is set. The BALENB flag is set during calibration. The acceleration balance test can be terminated in a number of ways. Preferably, the test is terminated when the test is complete, or when the ECM 20 receives a clear message from the user-interface 34. Additionally, the test is terminated when the ignition is turned to the "off" position, or if the vehicle speed is non-zero.

With continuing reference to FIG. 2, once the balance test is activated at step 50, a test sequence is entered at step 52 which includes an initializing step during which the idle speed is set to the value of BALSTR, a variable representing the balance start ramp RPM (the engine RPM at which the test starts). BALSTR preferably has a range of 0–2500 RPM and defaults to 1000 RPM. Additionally, requested torque is set to zero and the test cylinder variable ($CYL_{TST}$) is set to a value of '1' at step 52.

At step 54, the engine is allowed to stabilize prior to commencement of the actual test. During the stabilizing period, the test cylinder is cut out of the fueling scheme. Control flow proceeds to step 56 is when the stabilizing time exceeds or is equal to the settling time variable (BALTIM), which has a range of 0–30 seconds and a default value of 2 seconds.

As shown in FIG. 2, once the engine has stabilized, at step 56 the acceleration RPM with the test cylinder cut out is measured, starting with the first cylinder cut out. To do this, the fueling control signal, which could be a pulse width signal or derived from torque, for the remaining injectors, is set to the value of BALFPW, and the beginning of injection (BOI) time for the remaining injectors is set to BALBOI, wherein BALFPW is the balance pulse width variable, which has a range of 0°–30° and a default value of 13° (of crankshaft rotation), and wherein BALBOI is the balance beginning of fuel injection variable, which has a range of 0°–30° and a default value of 10°.

Control flow preferably proceeds to step 58 of FIG. 2 when the number of actual engine revolutions since the pulse width and injection time were set, equals or exceeds BALREV, the variable representing the balance end ramp revolutions, which has a range of 0–100 revolutions with a 1 revolution resolution and a default value of 8 revolutions. The value of BALREV is set to ensure the occurrence of a certain number of firings for the test. As is known, in a four stroke 8-cylinder engine, four cylinders fire for each crankshaft revolution, whereas all eight cylinders are fired each revolution in a two stroke 8-cylinder engine. With BALREV and BALFPW set to the indicated defaults, an increase in engine speed of approximately 500 RPM will be realized during the test. At this point (revs ≧BALREV), the engine speed is stored in memory for the cut out injector.

At step 58 of FIG. 2, the ECM determines whether or not an additional injector needs to be tested or whether the injector balance test is complete. If the value of $CYL_{TST}$ exceeds or equals the number of engine cylinders (ZNCYLH), no additional injectors need to be tested and control flow skips to step 62, wherein adjustment factors are determined. If, however, additional injectors are to be tested, the value of $CYL_{TST}$ is incremented at step 60, and control flow returns to step 54 so that steps 56 and 58 can be repeated for each injector to be tested.

With continuing reference to FIG. 2, at step 62 adjustment factors are calculated after all the injectors to be tested (i.e. cut out) have been tested. In a preferred embodiment, this entails first determining an average RPM ($RPM_{AVG}$) for the tested injectors according to:

$$RPM_{AVG} = \frac{\Sigma(RPM)}{ZNCYLH}$$

wherein Σ(RPM) is the sum of all RPMs measured at the conclusion of step 56. Next, an adjustment RPM ratio ($RPM_{ADJX}$) is determined for each cylinder according to:

$$RPM_{ADJX} = \frac{RPM_X}{RPM_{AVG}}$$

for x=1 to 8 for an eight cylinder engine, wherein $RPM_x$ is the RPM measured at the conclusion of step 56 for the particular cylinder. The adjustment factors ($FCT_{ADJX}$), which will ultimately modify the final injector pulse width, are determined according to:

$$FCT_{ADJX} = (RPM_{ADJX} - 1) * (ZNCYLH - 1) * BALGAN$$

wherein BALGAN is the balance gain which has a range of 0–2 with a default value of 0.8. A temporary adjustment factor ($FCT_{TMPX}$) is then determined according to:

$$FCT_{TMPX} = \min(BALLIM, \max(-BALLIM, (FCT_{ADJ(X-1)} + FCT_{ADJX})))$$

wherein BALLIM represents a balance limit having a range of 0–1 with a 0.01 resolution and a default value of 0.07. Thus, to determine the temporary adjustment factor, the ECM first identifies the maximum of −BALLIM and the sum of $FCT_{ADJ(X-1)}$ and $FCT_{ADJX}$ (wherein $FCT_{ADJ(X-1)}$ is the previous adjustment factor for that cylinder). The ECM then compares that maximum to the value of BALLIM, and takes the minimum of those quantities as the temporary adjustment factor.

At step 64, the adjustment factors are updated, and the results are output to the user. In the preferred embodiment, updating the adjustment factors includes normalizing the calculated adjustment factors. Normalization of the adjustment factors is accomplished utilizing a normalizing factor, determined according to:

$$FCT_{NRMX} = \Pi(1 + FCT_{TMPX})$$

Thus, $FCT_{NRMX}$ is obtained by taking the product of all $(1 + FCT_{TMPX})$ quantities. The fuel injector pulsewidth adjustment factor for each cylinder can then be determined according to:

$$FCT_X = \frac{(1 + FCT_{TMPX})}{FCT_{NRMX}} - 1$$

Once determined, at step 64, all of the adjustment factors for the cut-out cylinders (i.e. all values of $FCT_x$) are stored in memory and then multiplied by the final injector pulsewidth:

BALFPW=PWMULT* INCFAC$_x$* FCT$_x$* SPW wherein PWMULT is an engine-specific horsepower adjustment constant stored in non-volatile memory, INCFAC$_x$ is the injector fuel flow rate, and SPW is the base fuel pulse width determined by the ECM based on operating conditions is and known principles of ignition and combustion. Although not specifically shown in FIG. 2, the methodology could be performed using multiple iterations of the steps.

It is known that certain fuel injectors, sometimes termed high fuel, or hot, injectors, generate more power than other injectors. With the balance test of the present invention, the effects of this variation can be minimized by compensating the fuel delivery of each fuel injector. For example, if the engine has a high output injector, when that injector is cut out, the associated rise in engine speed resulting from the balance test will be less than the rise in engine speed occurring when the high output injector is fueled and a nominal injector is cut out. Adjustment factors compensate for a high output injector by reducing the fuel delivered to that injector. By compensating the fuel injectors, the present invention operates to reduce engine wear, reduce the amount of engine smoke and particulates generated, and provide smoother power delivery. It should be appreciated that the injector specific information described above may be retrieved and/or compared in the user interface 34 or in the ECM 20 for engine diagnosis and tracking purposes.

Figure 3:
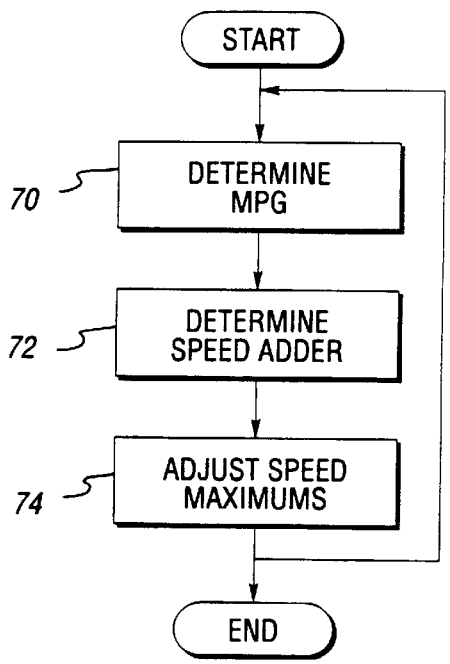
FIG. 3 is a flow chart detailing the steps for fuel economy speed limit addition according to the present invention.

Referring now to FIG. 3, there is shown a flow chart detailing the steps for a fuel economy speed limit adder according to the present invention. The goal of this aspect of the present invention is to provide an incentive to the vehicle operator to behave in a way generally consistent with the goals of the fleet managers to maximize fuel economy. Typically, drivers strive to increase vehicle speed. In light of this fact, increasing the speed available to the driver as fuel economy increases as a result of for example, minimzation of idle time, selection of the optimum transmission gear, maintaining a steady throttle, or reducing the use of engine-driven accessory loads, provides a powerful incentive for the driver to behave as desired.

The strategy to provide the speed-based incentive utilizes numerous variables. In the preferred embodiment, calibration values for these variables are as follows:

| NAME | RANGE | MINIMUM RESOLUTION | INITIAL VALUE |
|---|---|---|---|
| THRESH$_{MPG}$ | 2–20 MPG | 0.1 MPG | 7 MPG |
| MAX_MPH$_{MFG}$ | 0–10 MPH | 1 MPH | 5 MPH |
| MPH_MPG$_{GN}$ | 0–20 MPH/MPG | 0.1 MPH/MPG | 5 MPH/MPG |
| MPG_FILT$_{CON}$ | 0–0.01 | 0.00002 | 0.00055 |
| MPG_LIM | 0–10 MPG | 0.1 MPG | 3 MPG |
| MPG_TYPE | Switch | 0 = trip avg., 1 = filtered | |

Fuel economy, measured in terms of miles per gallon (MPG), can be either the trip average fuel economy (MPG_TYPE=0) or a filtered fuel economy (MPG_TYPE =1). In a preferred embodiment, filtered MPG (FIL$_{MPG}$) is utilized and is calculated at step 70 using a standard $1^{st}$ order lag calculation limited between calibration limits according to:

FIL$_{MPG}$=min (MPG_LIM+THRESH$_{MPG}$, max (THRESH$_{MPG}$−MPG_LIM, (FIL$_{MPG_{t-1}}$+MPG_FILT$_{CON}$* (INST$_{MPG}$−FIL$_{MPG_{t-1}}$))))

wherein MPG_LIM represents the maximum permissible deviation from the fleet fuel economy goal, THRESH$_{MPG}$ represents a threshold fuel economy, MPG_FILT$_{CON}$ is a fuel economy filter constant, INST$_{MPG}$ represents an instantaneous fuel economy, and FIL$_{MPGt-1}$ represents the previously determined filtered fuel economy. This calculation is done frequently, such as once per second, to react in a timely manner to current driver behavior.

The MPGMPH term, which represents the speed adder, is calculated to increase allowable vehicle speed once the threshold fuel economy has been obtained, although it is limited to the maximum speed calibration value MAX_MPH$_{MPG}$. More specifically, allowable vehicle speed is proportionally increased according to the amount by which the threshold fuel economy is exceeded. In a preferred embodiment, the MPGMPH term is determined at step 72 according to:

MPGMPH=min (MAX_MPH$_{MPG}$, MPH_MPG$_{GN}$* max (0, (INST$_{MPG}$−THRESH$_{MPG}$ )))

wherein MAX_MPH$_{MPG}$ represents the maximum amount the vehicle speed may be increased, and MPH_MPG$_{GN}$ is the fuel economy gain the value of which may vary based on customer input. For the feature to function as intended, the calculated MPG value is preferably saved across ignition cycles, and initialized to zero in the case of the first power up or in the case of an error. If the VSS fails, the speed adder is set to zero. At step 74, the ECM adjusts the speed maximums. More particularly, the cruise maximum MPH (CCMAXS) and the road speed limit maximum MPH (RSLMPH) are modified by the addition of MPGMPH to CCMAXS and RSLMPH when this feature is enabled.

According to another aspect of the present invention, fuel delivery to the engine is limited at certain altitudes. The goal of this aspect of the present invention is to prevent damage to the turbocharger from excessive speed or compressor surging at certain barometric pressures (such as those typically encountered at high altitudes), preferably by reducing power via a torque limit at those barometric pressures.

In a preferred embodiment, a limit torque (HATQ) is defined according to:

$$TMP = \frac{(RPM_{MX} - RPM)*(1 - TRQ_{MN})}{RPM_{MX} - RPM_{MN}} + PR_{TQ} * \max(0, (BARO - PR_{MN}))$$

and $$HATQ = \min(1, TRQ_{MN} + \max(0, TMP))$$

wherein RPM$_{MX}$ represents the RPM for maximum barometric pressure compensation which has a range of 0–2500 with a default value of 1800 RPM, RPM is the engine speed, TRQ$_{MN}$ represents the minimum torque after compensation which has a range of 0–100 and a default of 100%, RPM$_{MN}$ represents the minimum RPM for compensation which has a range of 0–2500 and a default of 1100 RPM, PR$_{TQ}$ represents the pressure gain for compensation which has a range of 0–2% per kPa and a default value of 1% per kPa, and PR$_{MN}$ represents the minimum pressure for compensation which has a range of 0–120 and a default value of 50 kPa. The calculations are performed, and the torque limit is imposed, when the conditions for torque limiting exist, such as if the barometric pressure is below that which provides a torque that is greater than or equal to the current requested torque. It should be noted that the variables are calibrated such that $RPM_{MX} > RPM_{MN}$.

Figure 4:
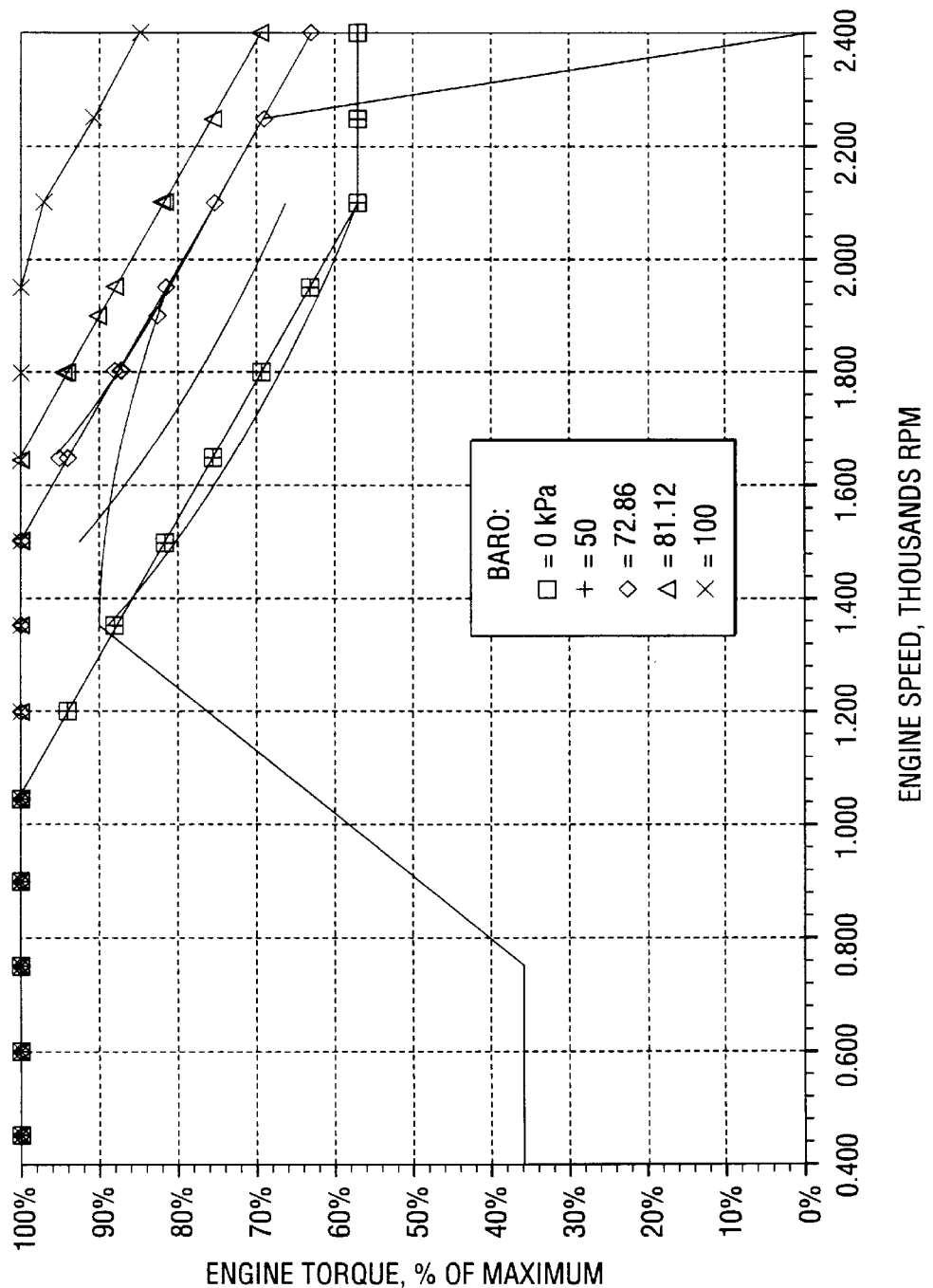
FIG. 4 is a graphical representation of the high altitude torque reduction as a function of barometric pressure and engine speed according to the present invention.

FIG. 4 is a graphical representation of the torque reduction (i.e. percent of maximum engine output torque) as a function of altitude and engine speed. The solid lines indicate typical requested torque limit, and lines of constant power. Limited torques are shown for barometric pressures of 0 kPa, 50 kPa, 72.86 kPa, 81.12 kPa and 100 kPa. As shown, the torque varies inversely with the barometric pressure (BARO) so that more torque reduction (less torque) is provided at lower barometric pressures typically encountered at high altitudes. More particularly, the graph illustrates various torque reductions for a particular engine application, with $TRQ_{MN}=57\%$, $RPM_{MN}=1050$ RPM, $RPM_{MX}=2100$ RPM, $PR_{TQ}=0.0080$, and $PR_{MN}=50$ kPa. Once determined, the limit torque may be imposed as a global engine torque limit as described above.

As previously noted, the user interface, or data hub, 34 is used to store user calibration parameters, fleet management information, and retrieve engine historical information logged as a result of diagnostic or malfunction codes. The data hub 34 preferably stores this information in sets referred to herein as pages, although various other methods of storage are possible, such as ASCII files. The first page relates to vehicle information. In the preferred embodiment, the vehicle information page includes total vehicle distance, total fuel used, total engine hours and engine serial number. All values are maintained from the first use of the engine, and can not be reset.

The electronic control module 20 can sample various sensors at regular intervals under controlled conditions, or it can sample continuously. For instance, the coolant temperature may be sampled continuously when the engine is expected to have reached operating temperature. Studying the trend data over a period of time gives an indication of the condition of the element being measured or may give an indirect indication of the condition of other elements of the engine. For example, a decreasing average for coolant temperature may indicate a malfunctioning thermostat, whereas an increasing average temperature may indicate a clogged radiator.

Accordingly, the electronic control module 20 cooperates with the data hub 34 to maintain a plurality of trend pages. Generally, trend information can be reset, but the preferred practice is to allow the trends to run continuously over the life of the engine. In this manner, a predetermined number of most recent samples, for example 100, are always available for trend analyses. For purposes of this discussion, the values represented by the letters "aaa", "bbb", and so on, can be user-specified to customize the trend information, and the value within parentheses after the letters indicates the default value. Of course, the default values may be hard-coded into the system, removing that aspect of customer input. Lastly, it should be noted that all trend pages may be reset. Resetting will clear all of the trend sample points stored on a particular page.

The first trend page maintained relates to oil pressure. An oil pressure trend sample is monitored during every aaa(20) engine hours. The average oil pressure during the time interval of the sample period where the RPM exceeded bbb(1600) but was less than ccc(1800), and the oil temperature exceeded ddd(180° F.) but was less than eee(220° F.) is taken as the sample. The starting engine hours at which time the sample period began is also stored. Generally, the oil pressure trend is monitored for an unusual change in pressure, such as a large drop in pressure. Such a drop in pressure may be indicative of mechanical problems, a regulation problem, fuel dilution, or a low quantity of oil.

The data hub also maintains a turbo boost pressure trend page. In the preferred embodiment, a turbo boost pressure trend sample is determined based on every aaa(20) engine hours. The average turbo boost pressure during the time interval of the sample period where the RPM was greater than bbb(1400) and less than ccc(1600) and the powertrain demand is greater than or equal to ddd(96%) and less than or equal to eee(100%) is taken as the sample. The starting point from which the sample had begun is also stored in the form of engine hours.

The turbo boost trend operates to monitor the fuel and air system. Generally, an air leak manifests itself as a reduction in the turbo boost. Similarly, a fuel restriction (e.g. clogged fuel filter) manifests itself as a reduction in the turbo boost.

As a means of monitoring the electrical system, the data hub 34 maintains a battery voltage trend page. A battery voltage trend sample is taken every aaa(20) engine hours for a period of bbb(60) minutes. The average battery voltage for all of the time in the sample period where the rpm was greater than ccc(1600) and less than ddd(1800) is taken as the sample. The starting point of the sample period is also stored. Generally, an unusual increase in battery voltage may be indicative of a voltage regulator failure, whereas an unusual decrease in battery voltage may be indicative of a broken alternator belt.

The data hub also maintains a fuel economy trend page. A fuel economy trend takes a sample every aaa(20) engine hours and records the average fuel economy between the last sample and the current sample. The starting point of the sample period is also stored.

As a means of monitoring the oil cooling system, the data hub 34 maintains a maximum oil temperature trend page. A maximum oil temperature sample is determined over every aaa(20) engine hours. The maximum oil temperature reached between the time the last sample was taken, and the current sample, is recorded on the page. The starting point of the sample period is also stored as cumulative engine operating hours. An oil temperature measurement which indicates a rise in maximum temperature may be indicative of engine mechanical problems.

Additionally, a coolant temperature sample is taken every aaa(20) engine hours. The maximum coolant temperature reached between the time the last sample was taken, and the current sample, is recorded. The starting engine hours point from which the sample was taken is also stored. A coolant temperature measurement which indicates a rise in maximum temperature may be indicative of a plugged radiator, a malfunctioning thermostat, or cooling fan anomalies.

The data hub also maintains a maximum RPM trend page. An RPM sample is taken every aaa(20) engine hours and the maximum RPM reached between the time the last sample was taken, and the current sample, is recorded on the page. The starting point of the sample period is stored in the form of cumulative engine operating hours. Through the maintenance of maximum RPM trend pages, driver comparisons are possible.

As another means of making driver comparisons, the data hub also maintains maximum vehicle speed trend pages. A speed sample is taken every aaa(20) engine hours. It records the maximum speed reached between the time the last sample was taken and the current sample, in addition to starting point of the sample period in the form of cumulative engine operating hours.

Additionally, the data hub 34 maintains minimum throttle position sensor voltage trend pages. It should be appreciated that various types of throttle position sensors, such as a ratiometric sensor, may be used. A throttle position voltage sample is taken every aaa(20) engine hours. The minimum throttle position voltage reached between the time the last sample was taken, and the current sample, is recorded, in addition to the starting point of the sample period in the form of cumulative engine hours. With this information, throttle position sensor wear can be monitored. Generally, the output of the throttle position sensor decreases in value as the sensor wears.

In addition to the trend pages discussed in greater detail above, the data hub 34 is capable of performing lifing of vehicle components, such as engine components. In a preferred embodiment, up to 10 components can be monitored independently. During the setup of the electronic control module 20 information, the names of the 10 components to be monitored can be specified by an operator, i.e. oil filter, coolant, oil, and the like. Each of the components can be monitored by one or more of the following mechanisms: vehicle distance travelled, engine hours used, calendar time, total engine revolutions, total fuel burned or idle time. The lifing information is maintained on a service interval page, which includes the value set for the service life and the total usage currently incurred, for each of the monitored engine components. The lifing information also preferably includes percent of life left, as well as the expected replacement/service date based on vehicle usage rates. The following components, to name a few, can be selected as standard for component lifing: oil filter, oil, air filter, fuel filter, and coolant. Each of the individual components for which the service interval is being calculated may be reset, so that its accumulated use is set to zero.

The event log page provides a coarse indication of the usage of the engine. In the event log, the state of the engine will be logged for the ninety-six (96) quarter hour intervals in a day. The event log will keep this information for a predetermined number of (the most recent) days, such as five (5). The following information is preferably available: start date and time, end date and time, number of entries, and entry (indicating engine on, off, idle, and cruise) for the 480 quarter hour entries. If the ECM clock is not properly set, or the power has been removed, this page may give inappropriate results.

In addition to the features described above, the electronic control module 20 also performs throttle control logic. More specifically, the electronic control module 20 determines a throttle position offset to ensure that the throttle position sensor (TPS) value is zero when the throttle is fully released, and to ensure that the value is forced to zero in error conditions as a safety precaution. An additional mechanism, if configured, operates to prevent the engine from being accelerated when a vehicle door is open.

In determining the throttle position offset, the electronic control module 20 utilizes an impulse filtered offset, a smoothed offset, and a computed offset. Generally, the impulse filtered offset is obtained by selecting the middle or median value of a group (such as three) of samples. Thus, the effect is to drop the highest and lowest samples of a group of samples. The smoothed offset is obtained utilizing a first order lag filter. The computed offset is obtained as described below.

Figure 5:
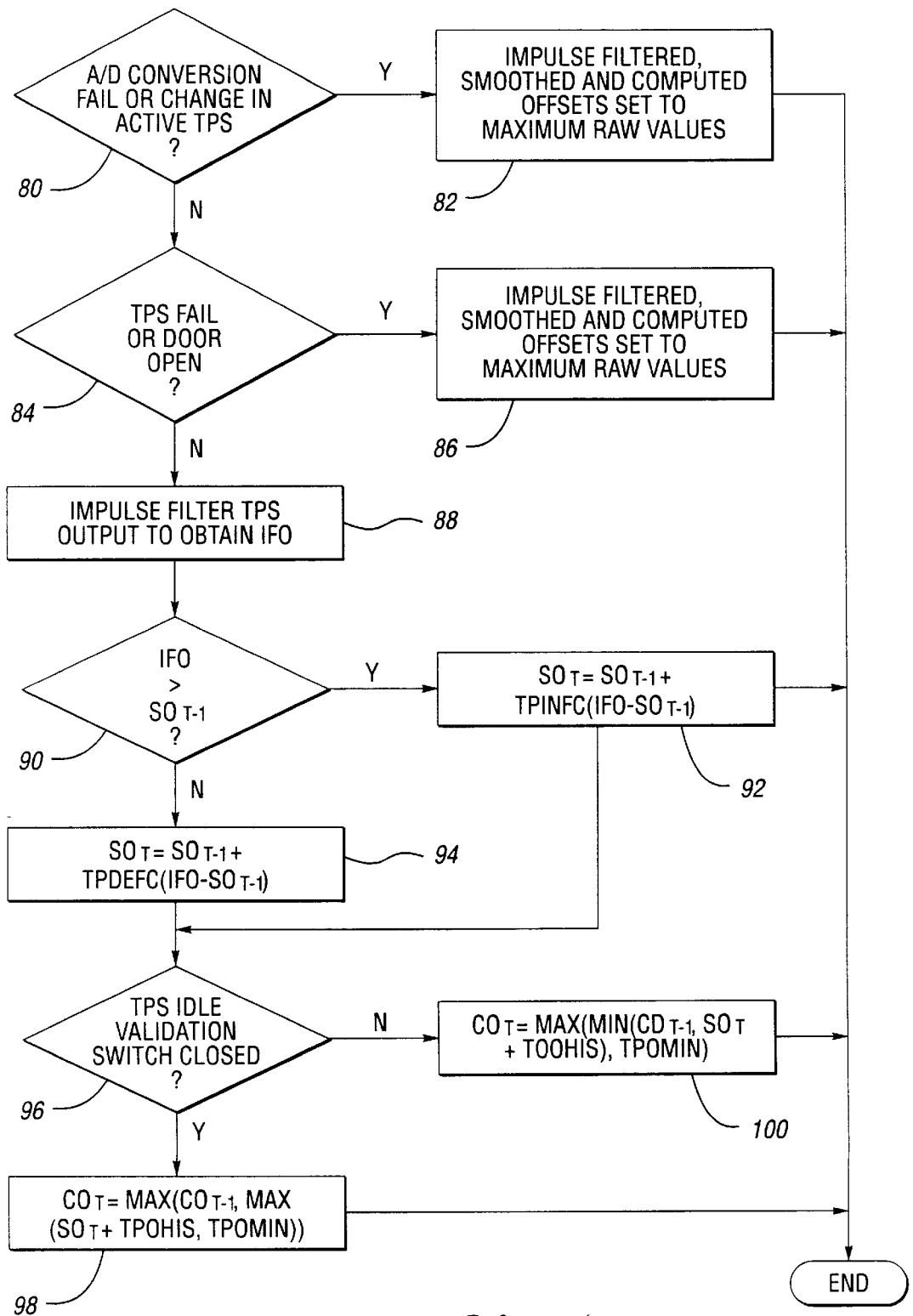
FIG. 5 is a flow chart detailing the throttle logic according to the present invention.

With reference now to FIG. 5, at the start of an ignition cycle, the impulse filtered offset, the smoothed offset, and the computed offset are initialized to the maximum physically possible raw value (e.g. 1023). If the A/D converter device associated with the TPS is in a conversion fail condition, or if a digital input is configured as a dual drive EFPA switch and the debounced state of that input changes indicating a change in the active TPS (step 80), then at step 82 the impulse filtered offset, the smoothed offset, and the computed offset are held at the maximum physically possible raw value.

As shown in FIG. 5, if a sensor fail low or sensor fail high fault is detected, or if one of the digital inputs to the ECM 20 is configured to be a door switch, and the debounced state of that input represents a low external input indicating an open vehicle door (step 84), the impulse filtered offset, the smoothed offset, and the computer offset are held at the maximum physically possible raw value at step 86.

Otherwise, at each conversion, the raw value of the TPS output is passed through the impulse noise filter at step 88, which, as described above, will keep the most recent three raw values and pass the arithmetic middle value (median). The result, which is the impulse filtered offset (IFO), is then filtered with a first order lag filter to obtain the smoothed offset as follows.

With continuing reference to FIG. 5, if the impulse filtered offset is greater than the previously determined smoothed offset (step 90), the equation (step 92) is:

$$SO_T = SO_{T-1} + TPINFC(IFO - SO_{T-1})$$

wherein $SO_T$ represents the new smoothed offset, $SO_{T-1}$ represents the old smoothed offset, TPINFC represents the throttle position sensor offset increasing filter constant which has a range of 01, and a default value of 0.01.

Otherwise, at step 94 the smoothed offset is determined as follows:

$$SO_T = SO_{T-1} + TPDEFC(IFO + SO_{T-1})$$

wherein TPDEFC represents the throttle position sensor offset decreasing filter constant which has a range of 0–1, and a default value of 0.2.

If the ECM 20 receives as a digital input a throttle idle switch output and the debounced state of that input represents a low external input to the ECM indicating a closed throttle idle validation switch (step 96), then the computed offset is obtained at step 98 as follows:

$$CO_T = \max(CO_{T-1}, \max(SO_T + TPOHIS, TPOMIN))$$

wherein $CO_T$ represents the new computed offset, $CO_{T-1}$, represents the old computed offset, $SO_T$ represents the smoothed offset, TPOHIS represents the throttle position sensor offset hysteresis which has a range of 0–250, and TPOMIN represents the throttle position sensor minimum offset which has a range of 0–250. Thus, the ECM 20 first compares the sum of the current smoothed offset and the TPS offset hysteresis and the TPS minimum offset and takes the maximum of the two. The ECM then compares that quantity with the previous computed throttle offset and takes the maximum of those two as the new throttle offset.

Otherwise, the computed offset is determined at step 100 according to:

$$CO_T = \max(\min(CO_{T-1}, SO_T + TPOHIS), TPOMIN)$$

Thus, the ECM first compares the previous computed offset to the sum of the current smoothed offset and the TPS offset hysteresis and takes the minimum. Next, the ECM 20 compares that quantity to the TPS minimum offset and takes the maximum of that comparison.

In addition to the features described above, the present invention includes a gear ratio torque limit embodied in a final torque determination by the electronic control module 20. The gear ratio torque limit strategy will first be provided, followed by an explanation of the variables, terms and the like used therein. It should be appreciated that although the present discussion focuses on a low gears torque limit, the strategy is equally applicable to other gear ratios with appropriate modifications.

Figure 6:
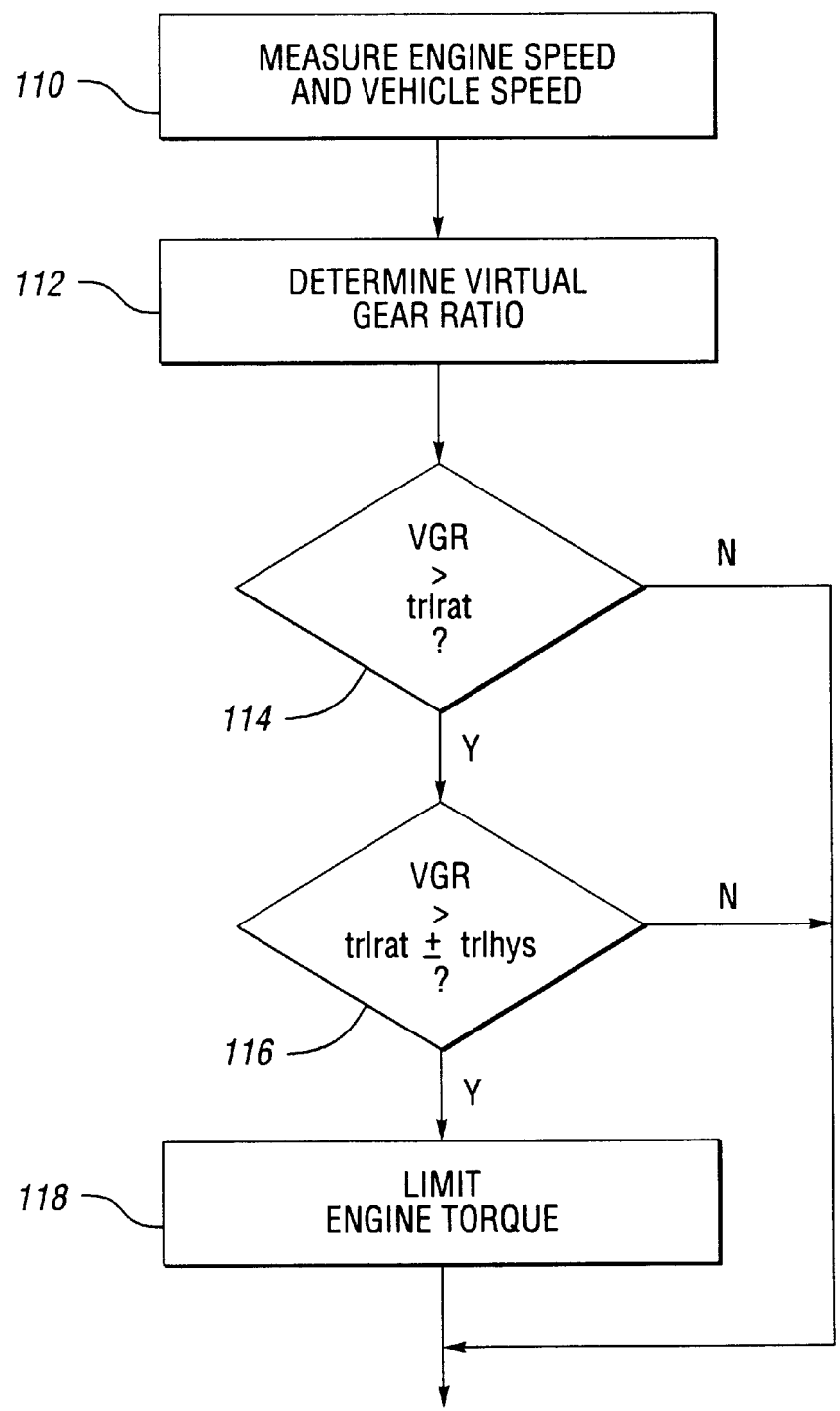
FIG. 6 is a flow chart detailing the gear ratio torque limit strategy of the present invention.

With reference now to FIG. 6, generally, the low gears torque limit strategy limits engine torque based on engine speed (ES) and vehicle speed (VS) in an effort to protect the transmission from damage. As shown, the engine and vehicle speeds are measured at step 110. More particularly, at step 112, a virtual gear ratio (VGR) is determined. VGR is defined as the ratio of engine speed and vehicle speed (VGR=ES/VS). At step 114, VGR is compared to a predetermined value, such as a low gear torque limit threshold (trlrat). Based on that comparison, engine torque may be limited. It should be appreciated that there could be predetermined values associated with a variety of gear ratios—rather than a single threshold.

With continuing reference to FIG. 6, in the preferred embodiment, at step 116, the ECM 20 determines if the VGR has not been below the threshold plus/minus some hysteresis (trlhys) since it was last above trlrat. Generally, if VGR is decreasing, VGR is compared to the quantity (trlrat−trlhys), whereas VGR is compared to the quantity (trlrat+trlhys) if VGR is increasing.

The use of hysteresis has known benefits. Based on the comparison at step 116, engine torque is limited to the value of the low gear torque limit (trllim) at step 118, which is calibratable. The result is that when the transmission is in a low gear (i.e. high engine speed relative to vehicle speed), the engine torque is limited. In this manner, a lighter duty transmission, with its attendant cost savings, can be utilized.

In the preferred embodiment, if the engine is being shutdown, due for example to the existence of a stop engine condition, final torque is set to zero. The determination of final torque (FTQ) varies based on numerous considerations described below. If the electronic control module is a master controller (rather than a slave controller), and a slave-to-master message has been read from a communications link (such as an SAE J1939 link) during the current ignition cycle, then final torque (FTQ) is determined according to:

$$FTQ=\min (RDTQ_{CTL}, RDTQ_{MSS}, SCTQ)$$

wherein $RDTQ_{CTL}$ is the rampdown torque determined by the ECM, $RDTQ_{MSS}$ is the rampdown torque from the most recent message received over the link, and SCTQ is the smoke control torque.

Otherwise, if the vehicle speed sensor is enabled, low gear torque limit is enabled, external engine synchronization is not set, and a vehicle speed sensor failure fault is detected, FTQ is:

$$FTQ=\min (RDTQ, trllim, SCTQ)$$

wherein RDTQ is rampdown torque, trllim is the low gear torque limit value having a range of 0–100% and a coarse resolution of 0.5%, and SCTQ is smoke control torque. Thus, the minimum of the three quantities is utilized as final torque.

Otherwise, if the vehicle speed sensor is enabled, low gear torque limit is enabled, external engine synchronization is not set, and the vehicle speed is less than the cruise control minimum speed to set the cruise, FTQ is determined according to:

$$FTQ=\min (RDTQ, trllim, SCTQ)$$

Otherwise, if the vehicle speed sensor is enabled, low gear torque limit is enabled, external engine synchronization is not set, and VGR has not been below trlrat − trlhys since it was last above trlrat, then FTQ is determined according to:

$$FTQ=\min (RDTQ, trllim, SCTQ)$$

wherein trlrat is the low gear torque limit VGR threshold having a range of 0–300 and a default of 0.01 RPM/MPH, and trlhys is the low gear torque limit VGR hysteresis having a range of 0–300 and a default of 0.01 RPM/MPH. Otherwise, FTQ is determined according to:

$$FTQ=\min (RDTQ, SCTQ)$$

Rampdown torque (RDTQ) is determined based on a stop engine limit torque, an overtemperature limit torque, and a marine limit torque, according to:

$$RDTQ=(\min SETQ, OTTQ, MLTQ)$$

wherein SETQ is the stop engine limit torque, OTTQ is the overtemperature limit torque, and MLTQ is the marine limit torque.

Generally, stop engine torque limiting occurs when a stop engine condition exists, such as low oil pressure. In the preferred embodiment, SETQ is determined according to:

$$SETQ=\max(setmin, ST*STPTST)$$

wherein setmin is the stop engine minimum torque, ST is the saved torque—the value of final torque FTQ at the time the first stop engine condition occurred, and STPTST is the stop engine throttle scaling time, which has a range of 0–100 and a coarse resolution of 0.5%.

Thus, to determine the stop engine torque limit, the ECM 20 compares the values of the stop engine minimum torque, and the quantity of the saved torque and the stop engine scaling time, and sets SETQ as the maximum of the compared values. If no stop engine condition exists, SETQ is 100% of the available engine torque or the final torque (FTQ).

As shown above, the rampdown torque is also based on an over temperature limit torque. Generally, over temperature torque limiting occurs when at least one over temperature condition exists. Typical over temperature conditions include, but are not necessarily limited to, excessive cylinder head temperatures, coolant temperatures, oil temperatures and transmission temperatures. If over temperature protection is enabled, in the preferred embodiment, OTTQ is determined according to:

$$OTTQ=\max (setmin, ST*DIWTST)$$

wherein ST is saved torque—the value of filtered torque (STQ) at the time the over temperature condition began, and DIWTST is the warning throttle scaling table value, the value of which varies based on the magnitude of the overtemperature. In one embodiment, DIWTST assumes a value between 0 and 100.

Marine limit torque is also utilized in determining the rampdown torque. Preferably, the marine limit torque is determined according to:

$$MLTQ = lmt + \left\{ \frac{tqtret - TMR_{TL}}{tqtret - tqtrst} * (MAXTQ - lmt) \right\}$$

-continued and $$lmt = DTQLMT(ENGRPM)(1 + TQADV(ARN, ENGRPM))$$

wherein tqtret is the maximum torque reduction end time, $TMR_{TL}$ is the torque limiting timer the value of which represents the time since the torque limit was exceeded, tqtrst is the maximum torque reduction start time variable, MAXTQ is the maximum torque of the engine, DTQLMT is the digital torque limiting table value which is based on the engine speed (ENGRPM), TQADV is the torque adjustment table value which is based on the engine rating and the engine speed, and ARN is the active rating number. If the $TMR_{TL}$ is less than the value of the maximum torque reduction start time variable (tqtrst), then the marine limit torque is 100% of the final torque.

As shown above, the final torque FTQ is determined with a comparison to SCTQ, the start and smoke control torque. If the engine is in the start mode of operation, SCTQ is determined according to:

SCTQ=RTQI+SMDTQ wherein RTQI represents the driver requested torque and SMDTQ is the starting torque, the value of which varies based on oil temperature and engine speed. In the preferred embodiment, the engine is in the start mode of operation if the engine speed is within a predetermined speed window. More specifically, the engine is in a start mode if the engine speed has not been above the quantity smiddl+ISPD (wherein smiddl represents a predetermined delta speed above the engine idle speed which must be exceeded to exit the start mode of engine operation, and ISPD represents the idle speed) since the engine speed was last below smback (which represents the engine speed to reenter the start mode).

Otherwise, if governor torque (GOTQ) exceeds the smoke limit torque (SLTQ), the engine is in a smoke control mode of operation, and SCTQ=SLTQ, which is determined utilizing the smoke limit torque (SCTORQ) function, the value of which varies based on engine rating (ARN), SCBST (smoke control boost pressure), and engine speed (ENGRPM):

SLTQ=SCTORQ(ARN,SCBST,ENGRPM)

Otherwise, SCTQ requested torque.

In a preferred embodiment, the ECM 20 also implements improved fan control logic. A detailed discussion of fan control is provided in U.S. patent application Ser. No. 08/113,424, filed on Aug. 27, 1993 now U.S. Pat. No. 5,445,128 issued Aug. 29, 1995, titled "Method for Engine Control" and assigned to the assignee of the present application, the specification of which is hereby expressly incorporated by reference in its entirety. More specifically, this feature adds the capability of providing fan operation based on the operational state of the transmission retarder, the coolant temperature, manifold air temperature, or the air inlet temperature. In a preferred embodiment, the system and method of the present invention impose a minimum engine output torque requirement prior to operating the cooling fan due to a high air temperature indication.

According to the present invention, the ECM 20 includes a digital input function providing for fan operation when the transmission retarder has been activated for a period of time and the coolant temperature has exceeded a particular temperature. In this way, the ECM 20 automatically energizes the fan so as to assist in the cooling of the engine to anticipate heat which will be absorbed by the coolant due to the operation of the transmission retarder. Prior art systems often rely primarily on the coolant temperature to activate the cooling fan. By anticipated the rise in coolant temperature, the present invention provides improved control of the engine operating temperature which has a number of attendant advantages as discussed below.

Still further, in a preferred embodiment, the ECM 20 includes an air temperature torque limit. If any part of the fan system were to fail, or if a vehicle operator forgets to remove their radiator winter cover prior to driving in warm ambient temperatures, the compressed air from the turbocharger will not be cooled sufficiently prior to delivery to the cylinders. As a result, combustion temperatures rise, as does friction, wearing the cylinder walls and piston prematurely. Although other configurations are possible, this feature is preferably configured such that torque is reduced if the air inlet temperature is greater than ATNTMP and engine speed is greater than ATNRPM to a maximum reduction of ATQMIN at ATXRPM. Setting ATNRPM to an RPM greater than the maximum transmission override RPM will disable this feature.

More specifically, whenever the air (compressed or uncompressed) inlet temperature rises above ATNTMP and the engine speed exceeds ATNRPM, an absolute torque limit will be computed. The torque of the engine will not exceed this limit. The air temperature torque limit is preferably configured to approximate constant horsepower for a given temperature which provides predictable engine behavior and appropriate engine protection. If the air temperature sensor fails high, the air temperature will ramp down or up to the default air temperature. The input filter constant AIIFC determines the ramp rate which preferably spans several seconds so that abrupt torque limit jumps do not occur.

The air temperature torque limit is determined according to:

$$A = \max\left(0, \frac{ATXTMP - AIT}{ATXTMP - ATNTMP}\right)$$

$$B = \max\left(0, 1 - \frac{ENGRPM - ATNRPM}{ATXRPM - ATNRPM}\right)$$

$$C = A*(ATQMAX - ATQMIN) + B*(1 - ATQMIN) + ATQMIN$$

$$ATTQ = \text{MIN}(1, \text{MAX}(ATQMIN, C))$$

wherein AIT is the air temperature (air inlet or manifold air temperature), ATNRPM is the engine speed at or below which ATTQ is 100% for any air temperature, ATQMAX is the absolute torque limit when the engine rpm is greater than or equal to ATXRPM and the air temperature is less than or equal to ATNRMP, ATQMIN is the minimum absolute torque limit (ATTQ equals this value when speed is greater than or equal to ATXRPM and the air inlet temperature is greater than or equal to ATXTMP), ATTQ is an absolute torque limit and is a factor in determining the rampdown torque (the final torque (FTQ) can not exceed this limit), ATXRPM is the engine speed at which ATTQ=ATQMAX when air temperature≦ATNTMP and engine speed is at or above which maximum torque reduction occurs, specifically ATTQ=ATQMIN when air temperature≧ATXTMP, and ENGRPM is the engine RPM averaged over 90° for 8- and 16-cylinder engines, 180° degrees for 4-cylinder engines, and 120° for others.

Figure 7:
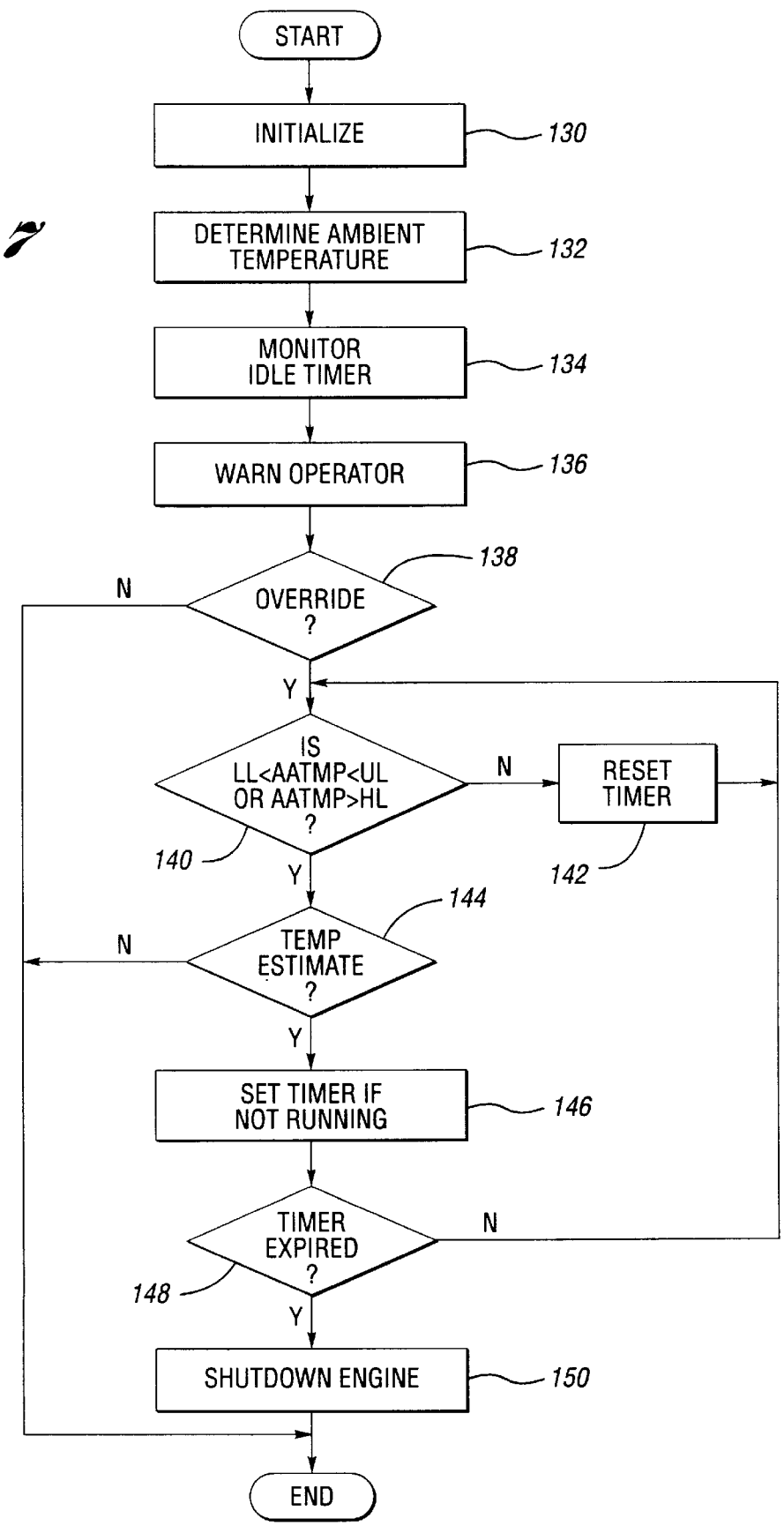
FIG. 7 is a flow chart illustrating a system and method for engine idle shutdown based on ambient air temperature according to the present invention.

Referring now to FIG. 7, a flow chart illustrating an idle shutdown feature between ambient temperature limits according to the present invention is shown. Similar to the previously described features, this feature is implemented by ECM 20. This feature provides for selective engine shutdown after a predetermined (or possibly adaptive) time period during which predetermined conditions are met. Since idling at low idle speeds produces sulfuric acid which deteriorates oil quality and may attack bearings, rings, valve stems, and other engine surfaces, this feature limits the period of time which an operator can allow the engine to idle. Furthermore, this feature helps to improve the overall fuel economy of the vehicle while reducing noise and emissions.

Block 130 of FIG. 7 performs various initialization functions such as determining whether an ambient air temperature sensor has been installed and is working properly, whether the parking brake is set, and the engine is idling, i.e. the accelerator pedal is not depressed and the high idle function is not active. The high idle function is provided to facilitate a vehicle warm-up cycle while avoiding the disadvantages associated with a low idle as described above. If an ambient air temperature sensor is not installed or is installed but not configured, the system will estimate the ambient air temperature as illustrated and described in detail with reference to FIG. 8. Similarly, if an ambient air temperature sensor is installed and a short circuit to ground is detected, the ambient air temperature will be estimated as described below. If an ambient air temperature sensor is installed and a short circuit to the vehicle battery is detected, the ambient air temperature is set to a value of 70° F., a fault is recorded, and the check engine light is illuminated. This prevents the idle shutdown from being overridden as long as 70° F. falls within the range established by the lower calibration limit (LL) and upper calibration limit (UL) as explained below. The idle shutdown feature can be disabled by setting the upper calibration limit (UL) to a value less than the lower calibration limit (LL).

Block 132 of FIG. 7 determines the ambient air temperature. This may be accomplished directly by monitoring the appropriate sensor, or may be an estimate as described in detail below. Block 134 monitors the idle timer to allow idling for a predetermined period of time, preferably five (5) minutes, before warning the operator of an impending engine shutdown at block 136. This warning may be any appropriate signal such as a buzzer, light, or the like. In a preferred embodiment, the check-engine light flashes for about ninety (90) seconds prior to engine shutdown.

During the warning period, the operator may override the shutdown, as indicated by block 138, provided operator override is enabled as determined by a calibration variable which may be set via user interface 34. Preferably, an override request is indicated by momentarily depressing the accelerator pedal. If operator override is not allowed as determined by the calibration variable, or the override is not requested by depressing the accelerator pedal (or a similar indication), the engine will be shutdown as indicated by block 150. If an operator override is enabled and detected by block 138, then control is passed to block 140.

Since it is desirable to allow extended idle periods under certain ambient temperature conditions, such as those which may justify operation of the vehicle heating or cooling system, block 140 determines whether the current ambient air temperature (AATMP) is within the range determined by the values of LL and UL. In a preferred embodiment, LL has a value corresponding to about 40° F. and UL has a value corresponding to about 80° F. If the value of AATMP is within the limits determined by the values of LL and UL, or the value of AATMP exceeds a high limit (HL) value, as determined by block 140, control passes to block 144. Otherwise, block 142 resets a delay timer which results in an unlimited idling time while the appropriate operating conditions are satisfied. The value of HL, which is preferably about 176 ° F., is utilized to detect an attempt to defeat the sensor by placing the sensor on a relatively hot surface. Thus, if the ambient air temperature determined by a temperature sensor exceeds this value, then the operator override is disabled resulting in engine shutdown as indicated by block 150.

If the ambient air temperature is being estimated as described above and illustrated by block 144, the delay timer is set (if it is not already running) at block 146. Preferably, the delay timer is set to about twenty (20) minutes. Block 148 then determines whether the delay timer has expired. The delay timer provides a sufficient settling time for various parameters used for the ambient air estimation function as described below. Once the timer initiated at block 142 or 146 expires, the engine will be shut down as indicated at block 150, i.e. only one override is allowed per ignition cycle. Similarly, if an ambient air temperature sensor is installed and functioning properly, settling time is not required and the engine is shutdown after the predetermined idling period elapses.

Figure 8:
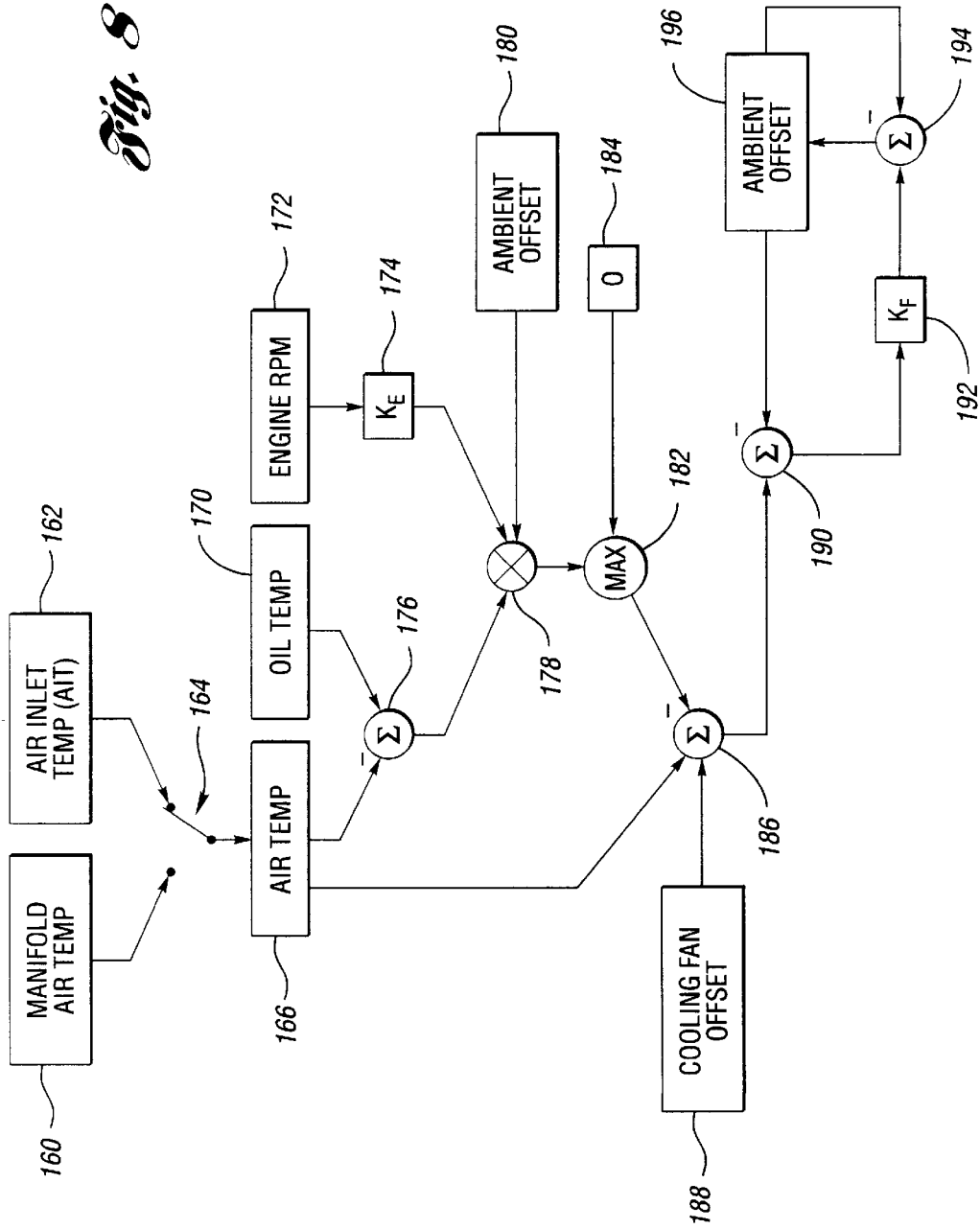
FIG. 8 is a graphical representation of a system and method for ambient air temperature estimation according to the present invention.

Referring now to FIG. 8, a graphical representation of ambient air temperature estimation is shown. In a preferred embodiment, ambient air temperature is estimated using information commonly available from standard engine sensors according to:

$$temp = T_{air} - \max\left\{0, \frac{T_{oil} - T_{air}}{\frac{RPM}{K_E}} * T_{a_{off}}\right\} + \text{Fan}_{off}$$

and $$T_{AATP} = T_{AATP} + K_F * (temp - T_{AATP})$$

where $T_{air}$ represents air temperature 166 which is the value of the manifold air temperature if a manifold air temperature sensor has been configured, as represented by block 160. Otherwise, air temperature 166 is equal to the air inlet temperature (AIT) 162, described above, as represented by element 164. Block 170 represents the engine oil temperature ($T_{oil}$) as determined by an associated sensor. Block 172 represents engine RPM which is scaled by the value of $K_E$ (6 in a preferred embodiment), as represented by block 174. Block 180 represents the ambient air offset factor ($T_{aoff}$) and block 188 represents a cooling fan offset (Fan$_{off}$). The "max" function, represented by block 182 selects the greater of the values within braces and delineated by a comma, i.e. the "max" function returns a value of zero for otherwise negative values. The ambient air temperature ($T_{AATP}$), represented by block 196, is equal to its previous value added to a scaled difference value as determined by scaling factor $K_F$, represented by block 194. Engine speed is included in the estimate since, as engine speed increases, the air temperature has less time to be heated by the engine. Similarly, the cooling fan offset is included when the cooling fan is on since this also reduces the air temperature.

Figure 9:
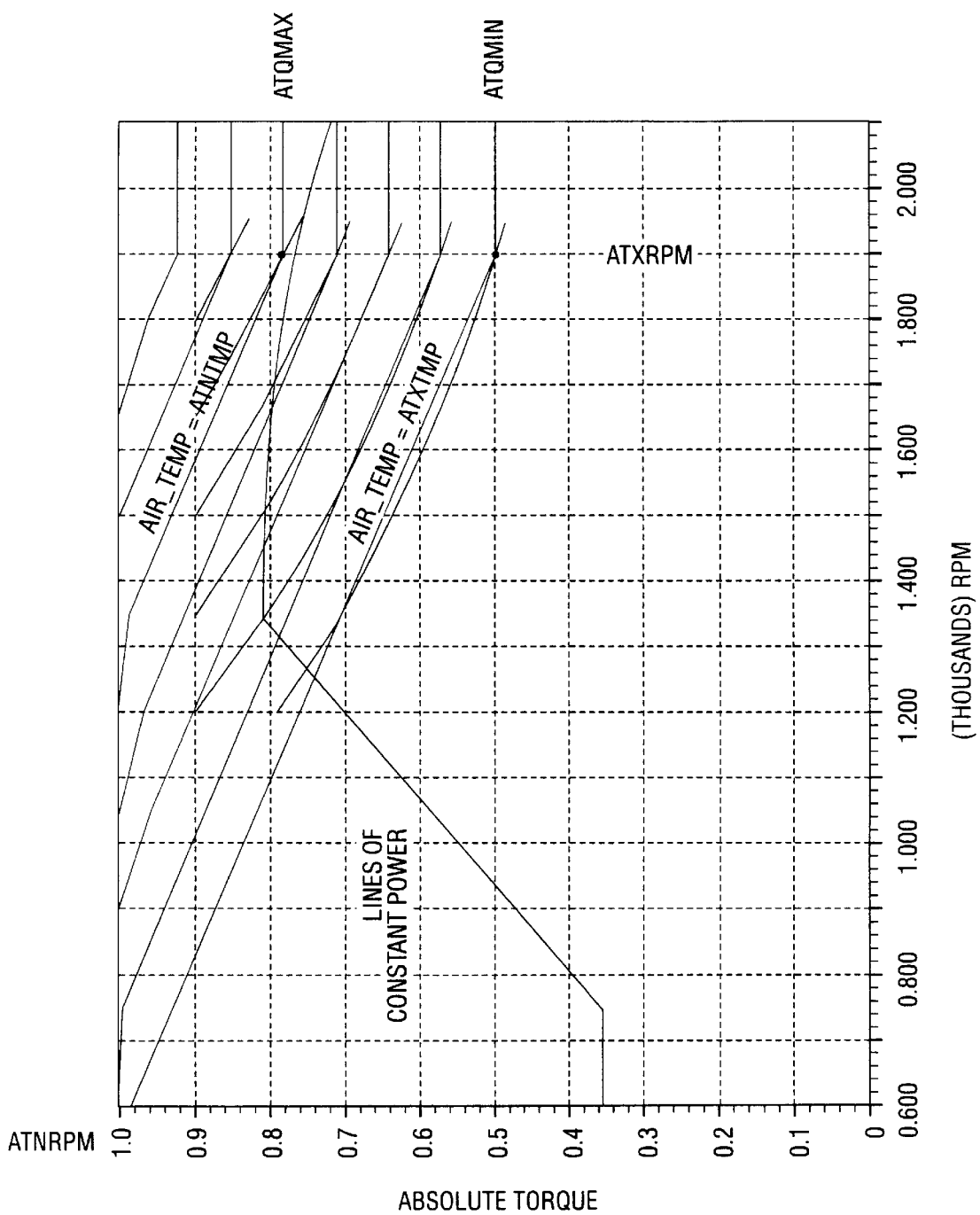
FIG. 9 is a graphical representation of absolute torque versus engine speed for use with the air temperature torque limit according to the present invention.

FIG. 9 provides a graphical representation of absolute torque versus engine speed which illustrates the relationship between engine speed, air temperature and torque limit in a vehicle system such as in a preferred embodiment of the present invention.

It is understood, of course, that while the forms of the invention herein shown and described constitute the preferred embodiments of the invention, they are not intended to illustrate all possible forms thereof. It will also be understood that the words used are descriptive rather than limiting, and that various changes may be made without departing from the spirit and scope of the invention disclosed.

What is claimed is:

1. A system for controlling an internal combustion engine to selectively limit engine torque, the system comprising:
    means for determining a gear ratio;
    means for comparing the determined gear ratio to a threshold value corresponding to a predetermined actual gear ratio and limiting engine torque when the determined gear ratio exceeds the threshold value.

2. The system of claim 1 wherein the means for determining a virtual gear ratio.

3. The system of claim 1 wherein the means for determining a gear ratio comprises:
    means for determining an engine speed; and
    means for determining a vehicle speed.

4. The system of claim 3 further comprising:
    means for detecting a vehicle speed sensor fault; and
    means for limiting engine torque when a vehicle speed sensor fault is detected.

5. A computer readable storage medium having stored data representing instructions executable by a microprocessor to control a diesel engine to selectively limit engine output, the storage medium comprising data representing:
    instructions for calculating a gear ratio;
    instructions for comparing the calculated gear ratio to a threshold value representing a predetermined actual gear ratio;
    instructions for controlling the diesel engine to limit engine output when the calculated gear ratio exceeds the threshold.

6. The computer readable storage medium of claim 5 further comprising data representing:
    instructions for detecting a vehicle speed sensor fault; and
    instructions for reducing available engine torque when a vehicle speed sensor fault is detected.

7. The computer readable storage medium of claim 5 wherein the instructions for calculating a gear ratio comprise:
    instructions for determining an engine speed; and
    instructions for determining a vehicle speed.

8. A system for controlling an engine to limit engine output under certain conditions, the system comprising:
    an engine speed sensor for providing an engine speed signal indicative of engine rotational speed;
    a vehicle speed sensor for providing a vehicle speed signal indicative of vehicle speed;
    a controller in communication with the engine speed sensor and the vehicle speed sensor, the controller including a microprocessor in communication with a memory having instructions executable by the microprocessor for determining engine speed based on the engine speed signal, instructions for determining vehicle speed based on the vehicle speed signal, instructions for determining a ratio based on the engine speed and the vehicle speed, instructions for comparing the ratio to a threshold value, and instructions for controlling the engine to limit engine output based on the comparison.

9. The system of claim 8 wherein the controller includes instructions for detecting a vehicle speed sensor fault and instructions for controlling the engine to limit engine output when a vehicle speed sensor fault is detected.

10. The system of claim 8 wherein the instructions for controlling the engine include instructions for reducing available engine torque when the ratio exceeds the threshold value.

11. The system of claim 8 wherein the threshold value corresponds to a predetermined actual gear ratio.

12. The system of claim 8 wherein the instructions for controlling the engine include instructions for reducing available engine torque when the ratio exceeds the threshold value by a predetermined amount.

13. A method for controlling a diesel engine having an engine speed sensor for providing a signal indicative of engine rotational speed, the engine mounted in a vehicle having a vehicle speed sensor for providing a signal indicative of vehicle speed, the method comprising:
    processing the signal indicative of engine rotational speed to determine an engine speed;
    processing the signal indicative of vehicle speed to detect a vehicle speed sensor fault; and
    reducing available engine torque when the vehicle speed sensor fault is detected.

14. The method of claim 13 wherein the step of reducing available engine torque comprises selecting the lower of a low gear limit torque, a smoke control torque, and a ramp-down torque.

15. A method for controlling an engine, the method comprising:
    determining a vehicle speed;
    determining an engine speed;
    computing a gear ratio based at least in part on the determined engine speed and vehicle speed;
    comparing the gear ratio to a threshold value; and
    limiting engine output when the gear ratio differs from the threshold value by a predetermined amount.

16. The method of claim 15 wherein the step of limiting engine output comprises reducing available engine torque.

17. The method of claim 15 wherein the step of limiting engine output comprises limiting engine output when the gear ratio exceeds the threshold by a predetermined amount.

18. The method of claim 15 wherein the gear ratio is a virtual gear ratio corresponding to the determined engine speed divided by the vehicle speed.

19. The method of claim 15 further comprising:
    monitoring the vehicle speed to detect a vehicle speed sensor fault; and
    limiting engine output when a vehicle speed sensor fault is detected.

20. A method for controlling an engine, the method comprising:
    determining engine speed;
    determining vehicle speed;
    determining a ratio based on the engine speed and the vehicle speed;
    comparing the ratio to a threshold value; and
    controlling the engine to limit engine output based on the step of comparing.

21. The method of claim 20 wherein the step of controlling comprises controlling the engine to limit engine output torque.

22. The method of claim 20 wherein the step of controlling comprises controlling the engine to limit engine output based on the ratio exceeding the threshold.

23. The method of claim 20 wherein the step of controlling comprises controlling the engine to limit engine output based on the ratio being less than or equal to the threshold.

24. The method of claim 20 wherein the step of determining a ratio comprises determining a virtual gear ratio.

25. The method of claim 24 wherein the step of determining a virtual gear ratio comprises determining a ratio of engine speed divided by vehicle speed.

26. The method of claim 20 further comprising selecting one of a plurality of threshold values based on a corresponding plurality of actual gear ratios, wherein the step of comparing comprises comparing the selected threshold value to the determined ratio.

27. The method of claim 20 wherein the threshold is a low gear torque limit threshold.

28. The method of claim 20 further comprising detecting a vehicle speed sensor fault, wherein the step of controlling the engine includes controlling the engine to limit engine output when a vehicle speed sensor fault is detected.

29. The method of claim 20 wherein the threshold value corresponds to a predetermined actual gear ratio.

* * * * *